Patented Jan. 13, 1948

2,434,451

UNITED STATES PATENT OFFICE 2,434,451

REFRACTORIES

Leslie W. Austin, San Jose, Calif., assignor, by mesne assignments, to The Permanente Metals Corporation, Oakland, Calif., a corporation of Delaware No Drawing. Application June 28, 1946, Serial No. 680,087

22 Claims. (Cl. 106—58)

This invention relates, generally, to novel and useful refractories and methods of making the same. More specifically, the invention relates to novel and useful refractories and methods of making the same wherein finely divided magnesia and silica of high purity are used to form a forsterite bond in situ between the particles of an aggregate material.

This present invention is a continuation in part of my co-pending applications: Serial No. 490,794, abandoned, filed June 14, 1943; Serial No. 507,044 filed October 20, 1943; Serial No. 532,210 filed April 21, 1944; and, Serial No. 532,211, abandoned, filed April 21, 1944.

As is well known, refractory bricks and shapes of the type used in metallurgical furnaces, kilns and other heat treating equipment, are generally made from a major portion of an aggregate materil bonded together with a minor portion of a bonding material. Except for the fact that the aggregate material should be non-acidic and of high grade, the present invention concerns itself with the particular bonding material utilized and the novel methods of refractory production made possible thereby.

The valuable properties of forsterite (magnesium ortho-silicate) as a refractory material, and particularly as a bonding agent for refractory aggregates, are well recognized. However, these valuable properties are only fully present when the forsterite is of high purity. Even minor amounts of impurities will greatly detract from the valuable properties. There is no adequate commercial source of the natural forsterite, of the requisite purity; and prior to this invention, there has been no adequate commercial source of substantially pure synthetic forsterite. However, by means of the present invention, not only is an adequate commercial source of substantially pure synthetic forsterite provided, but the invention permits the forsterite bonds to be formed in situ between refractory aggregate grains, from high purity magnesia and silica, without appreciable fusion. Such a bond, and method of forming the same, have not been previously available.

The object of this invention is the provision of novel and useful refractories and novel and useful methods of making the same, in which the products and methods of making the same are characterized by improvement in one or more of the following respects:

1. A crystalline bond is provided having increased load bearing strength both at cold and hot temperatures, as well as intermediate temperatures.

2. Refractories are provided having improved spalling resistance.

3. Refractories are provided having increased load strength in the unfired condition so as to permit firing in use in many cases without prefiring.

4. Crystalline, high melting point, bonds are developed without fusion.

5. The bonds are provided independently of the aggregate material.

6. Bonds are provided which are relatively insensitive to thermal and mechanical shock, and attack by the agents normally encountered under the conditions to which refractories are subjected.

7. Crystalline forsterite bonds are provided characterized by the absence of appreciable amounts of clino-enstatite.

8. Bonds are provided which afford high hot load strength.

9. Fired refractories may be produced at temperatures as low as 1200° C.

Other objects of the invention will, in part, be obvious and will in part appear hereinafter.

For complete understanding of the nature and scope of this invention, reference may be had to the following detailed description thereof setting forth, by way of illustration, certain specific refractory compositions and methods of forming the same into refractory articles.

As indicated above, this invention is primarily concerned with the bonding materials as distinguished from the granular aggregate materials, with the one exception that the aggregate materials should be either neutral or basic in character, i. e. non-acid. Periclase, chromite and forsterite, are examples of suitable aggregate forming materials. Excellent grades of periclase and forsterite may be made in accordance with the disclosures of my said copending applications Serial No. 507,044 filed October 20, 1943, and Serial No. 532,210 filed April 21, 1944, respectively.

The novel aspects of this invention are primarily concerned with the bond forming materials and the method in which the same are utilized. Two particular bond forming materials are used. One is magnesia, MgO, the other material is silica, $SiO_2$. It is essential in the practice of the invention that both of these bonding materials have a certain purity and be in a certain state of subdivision or fineness, that they be present in certain proportions; and, that they be intimately interspersed. These four factors are critical if all of the advantages of the invention are to be fully obtained.

The magnesia should have a purity of at least about 95% MgO and should have a particle size such that practically all of the particles are finer than 50 microns with a substantial portion finer than 10 microns.

There are several sources from which magnesia having these specifications may be obtained in quantity. A particularly pure grade of magnesia may be obtained by the precipitation of magnesium hydroxide from sea water or other brines, by calcined lime or dolonite, or other suitable bases. The magnesium hydroxide so precipitated may be burned in a suitable kiln to yield a magnesia of any of the known grades of activity from "caustic" to "dead-burned magnesia." The caustic magnesia may be difficult to use if its setting rate is too rapid. That is, when a magnesium oxychloride cement is employed as a chemical bond in a refractory composition, it may become hard and unsuitable for pressing, ramming or troweling before being shaped if the set takes place within about one hour after mixing.

Another source of magnesia is that obtained by calcination and grinding of natural materials such as brucite or magnesite if these raw materials are of sufficiently high initial purity.

For best results the lime (CaO) content of the magnesia should be less than 3%, and preferably less than 1.5%. The alumina ($Al_2O_3$) content should be less than 1% and preferably less than 0.5%. The boric oxide content should be under 0.5%. Iron oxide has a less deleterious effect than the other fluxing impurities and although it may be tolerated in moderate amounts, it should preferably be low and not exceed 1%.

The silica component should have the same specifications regarding purity and particle size as the magnesia, except that a major portion of the silica should be finer than 10 microns. Of course, the impurities present will be different from those present in the magnesia component. Silica of this grade may be secured in quantity from several sources.

As especially effective form of silica for use in this invention is volatilized silica, by which is meant silica which has been deposited from a vapor phase as an extremely finely divided amorphous powder. Such a silica may be prepared, for example, by oxidation of silicon vapor or the vapor of a lower oxide of silicon, and the condensation and collection of the resultant silica smoke. An economical source of such silica is its collection from the fumes arising from the industrial reduction of silica to form silicon alloys, such as ferro-silicon. It may also be recovered in similar fashion from the fumes of other reduction processes in which siliceous ores are reduced at high temperatures, as in the production of ferro-chromium.

The value of volatilized silica in the bond of this invention may be appreciated from a consideration of the sizing of the particles. Sedimentation analyses on samples of volatilized silica from ferro-silicon reduction fume have shown that 67% of the material was finer than 1 micron, and air permeability tests have indicated an average particle size for the same sort of material of about one third of a micron, with a specific surface of 67,500 square centimeters per gram. This material has a representative chemical analysis of 95% $SiO_2$, 2.5% of the oxides of iron, magnesium and aluminum together, 2% ignition loss, and only traces of other elements. A typical particle size analysis of volatilized silica is as follows:

SIZING ANALYSIS OF VOLATILIZED SILICA
(HYDROMETER METHOD)

| Size in Microns | Per Cent Finer |
|---|---|
| 44.0 | 99.1 |
| 33.5 | 98.4 |
| 19.0 | 93.8 |
| 12.5 | 86.5 |
| 10.0 | 82.4 |
| 7.5 | 77.5 |
| 5.0 | 74.2 |
| 4.0 | 70.6 |
| 1.0 | 67.2 |

A very important advantage of the volatilized silica is its amorphous nature. Amorphous silica has only about one twenty-fourth the expansion of crystalline silica upon heating from atmospheric temperature to 1000° C., besides avoiding the sudden volume changes accompanying the inversions of silica from one crystalline form to another. As a consequence, the structure of a brick comprising amorphous silica in the bond is much less likely to be disturbed or disrupted upon initial firing than is the structure of a brick in which crystalline silica is employed in the bond.

Although volatilized silica of the type described above is particularly desirable, silica of the required purity and particle size may be obtained from other sources. Thus, silica of high purity from any source may be ground to the necessary fineness in ball mills or other commercial grinding devices equipped with classifying means for separating out a product having the required particle size range.

As indicated above, the silica and magnesia must be used in the proper proportions. There must be at least enough magnesia present to combine with the silica to form forsterite. Since forsterite contains two moles of magnesia to one of silica, there should be at least 134 parts of magnesia to 100 parts of silica. However, in certain instances it is advantageous to use excess magnesia. But in no case should there be an excess of the silica.

Having fully described the properties of the ingredients useful in making refractories in accordance with this invention, the nature and scope of the invention will be more fully set forth in connection with the following test results and specific examples of refractory compositions made in accordance therewith The critical influence of the particle size of the magnesia and silica, added as bond, upon the properties of refractories prepared according to the invention may be seen from consideration of the results of tests tabulated below. In these tests all variables other than those noted were held constant as nearly as possible.

The load test was run at a load of 25 pounds per square inch on a 9 x 4½ x 2½" brick standing on end, and the samples were heated slowly to 1600° C. and held at that temperature for one hour. The deformation recorded is the average percent of shrinkage in the direction of loading, and it is a measure of the thermoplasticity developed in the sample at this temperature.

The spalling tests were run in the following manner. The samples used were cubes 2 x 2 x 2½", cut from bricks of the composition being tested. The unfired samples under test were heated slowly to 1500° C. to allow reactions and mineral formation in the bond to take place. The furnace was then cooled slowly to 1200° C. and the test begun. The samples were removed from the furnace, set upon a 2½" firebrick floor, and allowed to cool in the air for 20 minutes. They were then replaced in the 1200° C. furnace and heated for 20 minutes. The cycle of heating and cooling on 20-minute intervals was repeated until the specimen could be broken in the hands at the end of a cooling period. The spalling resistance is reported as the average number of cycles withstood before such failure.

Table I presents data illustrating the effect of variation in two factors, the particle size of magnesia and the particle size of silica used in the bond of a refractory brick.

All batches were made up with the same grain which was a periclase material having the following analysis:

| | Per cent |
|---|---|
| MgO | 95.4 |
| SiO$_2$ | 3.0 |
| Fe$_2$O$_3$ | 0.3 |
| Al$_2$O$_3$ | 0.2 |
| CaO | 1.1 |

Samples A, B, C and D were identical, except with respect to the sizing of the silica particles. Samples E and F differed from the others in respect to the particle sizing of the magnesia. Samples E and F differed from each other in that the silica in sample E had the same sizing as that in sample A, while the silica in sample F had the same sizing as that in sample D.

TABLE I

| Sample | A | B | C | D | E | F |
|---|---|---|---|---|---|---|
| Patch type | I | I | I | I | I | II |
| Magnesia Sizing Per Cent Passing: | | | | | | |
| 6 mesh | 100.0 | 100.0 | 100.0 | 100.0 | 100.0 | 100.0 |
| 20 mesh | 55.5 | 55.5 | 55.5 | 55.5 | 53.1 | 53.1 |
| 100 mesh | 35.5 | 35.5 | 35.5 | 35.5 | 17.1 | 17.8 |
| 200 mesh | 35.0 | 35.0 | 35.0 | 35.0 | 12.4 | 12.4 |
| 325 mesh | 26.2 | 26.2 | 26.2 | 26.2 | 8.6 | 8.6 |
| Silica Sizing (of silica in batch) per cent smaller than— | | | | | | |
| 325 mesh | 99.1 | 98.5 | 92.5 | 80.0 | 99.1 | 80.0 |
| 10 microns | 82.4 | 62.5 | 46.1 | 22.6 | 82.4 | 22.6 |
| 1 micron | 67.2 | 15.7 | 9.0 | 4.4 | 67.2 | 4.4 |
| Specific Surface in sq. cm. per gm | 37,500 | 7,410 | 5,420 | 2,800 | 37,500 | 2,800 |
| Spalling Resistance Cycles | 20 | 16.75 | 13.25 | 5 | 2 | 2 |
| Per Cent Deformation @ 1600 C for 1 hour, 25# per square inch load | 7.64 | 8.33 | 9.36 | 9.38 | 4.51 | Shear |

The proportions of Batch types I and II in Table I were as follows:

BATCH TYPE I

| | Per cent |
|---|---|
| Periclase, minus 6-plus 20-mesh | 40.8 |
| Periclase, minus 20-plus 100-mesh | 18.0 |
| Periclase, minus 100-mesh | 28.1 |
| Silica, minus 200-mesh (sizing varies) | 3.2 |
| Intermediate-burn magnesia, minus 325-mesh | 4.3 |
| Magnesium chloride (6H$_2$O) | 1.8 |
| Water | 3.8 |

BATCH TYPE II

| | |
|---|---|
| Periclase, minus 6-plus 20-mesh | 39.5 |
| Periclase, minus 20-plus 100-mesh | 29.7 |
| Periclase, minus 100-mesh | 15.0 |
| Silica, minus 200-mesh (sizing varies) | 11.7 |
| Goulac (sulfite waste liquor) | 0.8 |
| Water | 3.3 |

The organic binder was employed in Batch type II because the elimination of the active magnesia precluded the use of any oxychloride cement temporary bond.

Samples E and F were made up to illustrate the effect of substantially eliminating the very fine active magnesia employed in samples A, B, C and D. The amount of fine magnesia contained was that obtained in crushing a batch in a pan mixer to give sufficient plasticity for pressing.

In all cases the grain material was moistened in a pan mixer with the water containing the temporary binder in solution, then the dry bond material was blended in to coat the moistened grains. When the batch was uniformly mixed, it was pressed into shapes at approximately 10,000 pounds per square inch. The shapes were then allowed to cure and were dried below 350° F. before beginning the testing.

As may be seen from the table, considering samples A to D, increasing the fineness of the silica while the other factors are held constant increases the resistance to spalling and to load at high temperatures, particularly when more than half of the silica is finer than 10 microns or when the specific surface becomes greater than about 6000 square centimeters per gram. This increase in performance reflects the degree of completeness of the reaction between magnesia and silica to form forsterite and the extent to which the system has come to equilibrium. To secure such improved results the particle size of the reacting oxides must be sufficiently small that the reaction can proceed completely through each particle rather than take place only in a surface layer. The latter case, when the particles are too large, results in a heterogeneous system of silica, clino-enstatite, forsterite, magnesia and glass, and the properties of a refractory comprising such a system as a bond are markedly inferior to those of a refractory bonded by crystalline forsterite as a substantially homogeneous phase. Ideally, the particles of the reacting magnesia and silica should be of the order of one micron or smaller in diameter, but practically it has been found possible to secure improved and satisfactory results when substantially all of the magnesia added as bond is finer than 50 microns and a substantial portion is finer than 10 microns, and when substantially all of the silica added as bond is finer than 50 microns and more than half is finer than 10 microns.

In comparing the performance of samples A to D with that of samples E and F, it may be seen that the inclusion of the fine magnesia in the former group has given greatly increased resistance to spalling over the second group in which relatively coarse magnesia is employed. The poor results of the tests on sample F, in which both the silica and the magnesia, although finely divided by ordinary standards, are relatively coarse as compared to the materials of the invention, illustrate the deleterious effect of the formation of excessive amounts of clino-enstatite in the bond.

Further indication of the importance of the particle size of the silica employed in the bond may be seen from consideration of the results given in Table II below, of crushing tests on fired and unfired cubes cut from bricks prepared according to Example I above, except that in the different samples silicas of various sizes were used. The results given and the materials used in samples 1 to 5, Table II, are within the region considered operable in the service of the invention, but the notable improvement in bonding strength, accompanying increase in the specific surface of the silica used in the bond illustrates the value of employing the finest silica economically feasible. As a basis for comparison, results are included in Table II (note sample 6) for similar tests on a chemically bonded periclase brick prepared according to the teaching of the prior art.

In Table II the sizing of the silica is reported in terms of specific surface as it presents a more readily understandable picture of the nature of materials which are so finely subdivided. For comparison, the specific surface of the finest Portland cement—an impalpable flour—is approximately 2800 sq. cm. per gm.

TABLE II

*Crushing stress, pounds per square inch, cold (values rounded off to nearest 50 p. s. i.)*

| Sample | Specific Surface of SiO₂ in Bond, Sq. Cm. Per Gm. | Unfired | 1000° C. | 1200° C. | 1450° C. |
|---|---|---|---|---|---|
| 1 | 67,500 | 17,500 | 6,550 | 8,000 | 17,750 |
| 2 | 52,500 | 15,500 | 4,850 | 11,900 | 17,750 |
| 3 | 37,450 | 13,600 | 4,100 | 7,300 | 15,550 |
| 4 | 22,450 | 12,800 | 1,400 | 4,100 | 15,750 |
| 5 | 7,410 | 11,200 | 1,050 | 2,890 | 13,600 |
| 6 | (Prior Art) | 2,600 | 1,100 | 1,400 | 3,000 |

As stated above, it is in general operable to use the magnesia and silica in their combining ratio to form forsterite, that is, two moles of magnesia to one mole of silica, or for practical purposes, 134 parts of magnesia to 100 parts of silica. These ratios apply to the pure materials; when impurities are present it may be desirable to calculate from the analyses the additional amounts of magnesia required to convert these impurities to the higher temperature forms. But when, as preferred, the amounts of impurities are kept to the minimum the above ratio of magnesia to silica in the bond will in general give satisfactory results. Under certain circumstances, however, it may be desirable to depart from the theoretical ratio and advantages may be gained by so doing. Good results have been obtained where the ratio of magnesia to silica capable of forming a bond is 6 to 1. A ratio of up to 10 parts magnesia to one of silica may also be used.

Because of the rapidity with which the softening temperature drops as silica in excess of the forsterite ratio is added to the bond composition, it is considered preferable to include in the bond forming materials an excess of magnesia over that theoretically required to form forsterite. Such an excess may be desirable for one or more of the following reasons. It tends to insure that there is sufficient magnesia locally available to each silica particle to permit the forsterite-producing reaction to proceed to completion without the production of appreciable amounts of clinoenstatite. It helps to transform, into higher-melting compounds, the impurities and secondary components associated with the refractory materials. It may be desired to match the composition of the ceramic bond to that of the aggregate grain employed, when, for example, a synthetic grain is used having a composition in the range between that of periclase, MgO, and forsterite, 2MgO.SiO₂. A refractory so composed has the advantage that on firing to the temperature of formation of the bond, 1400° to 1500° C., the bond and the grain become practically homogeneous, and internal thermal stresses and strains are thereby minimized.

The magnesia and silica, in the proper ratio as outlined above, are thoroughly and intimately intermixed. The most complete interdispersion practicable is desired. To achieve this end a number of essentially equivalent procedures may be followed. The preferred method is to make a part of the finely divided oxides into a slurry in all of the liquid vehicle used to plasticize the batch, wet the aggregate grains of the batch with this slurry in a wet-pan mixer, and then add the remainder of the dry bonding materials to the slurry-coated grains in the mixer so that the grains are each uniformly coated with a semi-dry layer of the bond forming materials. The above method, subject of patent application S. N. 556,090, filed September 27, 1944, was arrived at to provide excellent intermixing of the very finely divided oxides, particularly in the slurry step, and to properly locate the bonding materials uniformly about the aggregate particles without excessive segregation or "balling-up" of the very fine materials.

With care and prolonged treatment in good mixing devices it is possible to secure good results by adding the bond-forming oxides along with the other ingredients of the batch and mixing the entire batch at one time, with subsequent tempering with water or bonding solution. However, it would be preferable in this method to premix the oxides in the desired ratio in a suitable device such as a ball mill, for example, to insure complete dispersion before adding to the batch.

The best mixing of such fine materials is probably secured in a slurry in which the mixing is accomplished by such means as a turbine mixer, homogenizer, high-speed pump or propeller, or the like. However, the quantity of liquid employed in most refractory compositions is not sufficient to yield a mobile slurry with all of the bonding oxides employed, and as a result it is generally desirable to add part of the bond to the aggregate as a slurry and part as a dry mixture.

In order to secure good interdispersion it may be desirable to make all of the silica and magnesia employed in the bond into a dispersion in water, thoroughly mix them by appropriate means, and subsequently filter off excess water to yield a filter-cake having the desired liquid content to plasticize the refractory batch, which filter-cake is subsequently mixed in with the aggregate grains in the proper proportion. Or the mixed slurry may be dried and fired to drive off combined water and restore the activity of the magnesia and its ability to take a set, the resultant solids then being ground and employed as the bond.

Magnesium hydroxide slurry may be employed in an analogous process. Sufficient finely divided silica is added to the magnesium hydroxide slurry to result, after firing, in the desired magnesia to silica ratio for the bond. The silica is completely dispersed in the slurry by any appropriate means, and the resultant mixture is filtered and fired in a rotary kiln or the equivalent to temperatures below the reaction temperature of the oxides but sufficient to dehydrate the magnesia. The resultant product is then cooled and very finely ground and is then used as the bonding material for a refractory composition. Alternatively, the silica may be dispersed in the brine before precipitation of the magnesium hydroxide. It will be seen that this process comes within the scope of the invention, since the silica is employed in the required purity and sizes as outlined above, and is very thoroughly interdispersed in magnesia-producing particles of high-purity and very fine particle size. Freshly precipitated magnesium hydroxide is reported to occur in a substantially colloidal condition. The mixture is then fired to produce the oxides in such condition that they are suitable for producing forsterite without appreciable fusion when fired in the interstices between the grains comprising the aggregate of a refractory composition.

Magnesium hydroxide slurry or the dry powder may also be used to supply all or part of the magnesia component of the bond when added to the refractory batch for certain purposes. However, in this case, special provision must ordinarily be made to take care of the great shrinkage of the hydroxide upon firing.

EXAMPLE I

A highly satisfactory magnesia refractory composition may be prepared by the following method. The refractory grain employed is a periclase material, prepared from seawater magnesia, of which the following is a representative analysis.

| | Per cent |
|---|---|
| $SiO_2$ | 8.0 |
| $Fe_2O_3$ | 0.5 |
| $Al_2O_3$ | 0.3 |
| CaO | 1.3 |
| MgO (by difference) | 89.9 |

The grain material is crushed to a sizing suitable for the manufacture of refractory bodies, so that all of the material is smaller than 6-mesh, 53 per cent is finer than 22-mesh, and 32 per cent is finer than 100-mesh. Preferably, about 20 per cent should be finer than 325-mesh, the sizes mentioned being of the Tyler Standard Screen Series.

The magnesia employed in the bond is a seawater magnesia analysing about 1.0% $SiO_2$, 0.2% $Al_2O_3$, 0.3% $Fe_2O_3$, 1.3% CaO, and 97.2% MgO by difference. This product is burned to low activity so that its setting rate is slow, and is then ground so that at least 70%, and preferably 90% or more, is finer than 325-mesh.

The silica employed in the bond is volatilized silica recovered from the fume given off in the production of ferrosilicon. As described above, it is approximately 97% silica on an ignited basis, and it is substantially all minus 325-mesh in size, with a major portion finer than one-micron.

The magnesia and silica are used in the bond in the ratio of 134 parts of magnesia to 100 parts of silica. Based on the weight of the grain material, 5.7% of the magnesia and 4.3% of the silica are used in the batch. In addition, 4% of water and 1% of magnesium chloride $$(MgCl_2.6H_2O)$$

on the same basis are employed.

The magnesia and silica are thoroughly interdispersed, and about half of the dry bond materials is made into a slurry with all of the water and the magnesium chloride. This slurry is thoroughly blended with the grain material in a wet-pan mixer so adjusted as not to crush the aggregate grains but to provide good shearing action in the bed of material being mixed. Subsequently, the balance of the dry bond materials is added to the mixer, and the mixing is continued until the slurry-wet grains are uniformly coated with a semi-dry layer of the bonding materials. The batch is then suitable for pressing or ramming, and in the present instance is pressed at approximately 10,000 pounds per square inch into refractory shapes. The shapes are allowed to cure. They are then suitable for use as a chemically bonded refractory, or they may be fired in a kiln prior to service. To produce a burned refractory, the shapes are fired above 1400° C. and preferably at about 1500° C. for several hours to allow the forsterite producing reaction to come to equilibrium. As a chemically bonded refractory, bricks produced in this manner have gone as high as 1815° C. on the hot-load test under load of 25 lbs. per sq. inch, and they have shown no spalling losses in 12 cycles in the standard dry panel spalling test at 1400° C. Satisfactory fired refractories having good structural strength and improved spalling resistance may be prepared by firing shapes produced according to the invention at about 1200° C. In this case, as with the chemically bonded refractories, the ultimate magnesium orthosilicate bond is formed in service.

EXAMPLE II

Periclase grain material of the same kind and prepared in the same manner as in Example I is used.

Magnesia of the same kind and fineness is used in the bond as in Example I.

The silica component of the bond is a finely ground silica of high purity. The material averages 99% or higher in silica, with only traces of alumina, lime, and iron oxide as impurities. The silica is prepared by grinding in a ball mill in closed circuit with an air classifier, and the product is 96% finer than 44 microns, 65% finer than 10 microns, and 14% finer than one micron.

The magnesia and silica are used in the bond in the ratio of 134 parts by weight of magnesia to 100 parts of silica, and the quantity of the bond, that is 10%, and of the water and magnesium chloride used, and the manner of mixing and pressing are identical with these steps in Example I. After pressing the shapes are allowed to cure under atmospheric conditions for seven days, and they are then dried in a tunnel drier at temperatures below 300° F. for eight hours. Upon cooling the shapes are suitable for use as chemically bonded refractories. Refractories prepared in this manner have gone to 1805° C. under load of 25 pounds per square inch on the hot-load test before failure by shear.

EXAMPLE III

A chromite refractory having very good spalling and load-bearing characteristics may be prepared according to the invention in the following manner. The chromite grain material consists of ground chrome ore, of which the following is a representative chemical analysis:

| | |
|---|---|
| $Cr_2O_3$ | 40.10 |
| $Al_2O_3$ | 25.40 |
| $Fe_2O_3$ | 14.03 |
| MgO | 4.02 |
| CaO | Trace |
| $SiO_2$ | 15.20 |
| | [1] 98.75 |

[1] Balance undetermined.

The chromite is crushed so that it is all smaller than 4-mesh, and the finer portions, which are richer in the lower-melting secondary components, are removed so that substantially all of the chromite used is coarser than 40-mesh. Chrome ore of this kind comprises 70% of the grain material. The remaining 30% of the grain material is composed of periclase of the sort used in Example I crushed so that substantially all of it is finer than 20-mesh and two-thirds of it is finer than 100-mesh. The use of the coarser portion of the periclase fraction of the grain has been found advantageous in reducing shrinkage in the bond on firing.

The chrome ore and periclase grain material in the above proportions and sizes is substituted for the periclase grain material in the process of Example I, the materials and method of preparation of the bond and the steps of mixing, pressing and curing being identical with those outlined there.

Chemically bonded chrome-magnesia refractory shapes produced in the above manner have gone to 1700° C. before failure by shear on the hot-load test under 25 pounds per square inch loading, and they have shown no spalling losses in the standard dry panel spalling test at 1400° C.

EXAMPLE IV

Chromite-magnesia refractories of properties equivalent to those in Example III may be produced by substituting the grain material of Example III for the periclase grain material of Example II and in all other respects following the method of Example II.

EXAMPLE V

Synthetic magnesia-magnesium orthosilicate refractories which are of high refractoriness but of lighter weight than magnesia refractories such as those cited in the earlier examples, and which are particularly suited for use in basic furnace in-roofs may be prepared by the method of the invention. The bonding material may have the same composition and physical characteristics as those of the grain material, with consequent reduction in internal stresses and prolongation of refractory life.

The grain material may, for example, be of the following composition:

| | Per cent |
|---|---|
| MgO | 77.6 |
| $SiO_2$ | 18.8 |
| $Fe_2O_3$ | 1.3 |
| $Al_2O_3$ | 0.8 |
| CaO | 1.0 |

Refractory grain of the above composition may be prepared by fusing together the commercially pure oxides at temperatures in excess of 1800° C., or, preferably, by the method of application S. N. 532,210 of April 21, 1944, by reacting the specially prepared oxides without fusion at approximately 1600° C. Grain material of this composition is crushed to pass a 4-mesh screen and sized in the known manner to form the aggregate for a refractory batch in which 50% of the particles are coarser than and 50% are finer than 22-mesh.

Very finely divided magnesia and silica of the sort described in Example I are used as the bond-forming materials. However, they are used in proportions to yield a bond having the magnesia to silica ratio the same as that of the grain material. Since that ratio in the grain is 4.13 to 1, by calculation, taking into account the purity of the materials, 100 parts of magnesia are used with 22.5 parts of silica.

To 100 parts by weight of the sized grain material in a wet-pan mixer are added 2 parts of magnesium chloride and 5 parts of water. The bonding materials are then gradually added in dry form, 15 parts being used. When the batch is uniformly mixed, it is pressed at high pressure, preferably at 10,000 pounds per square inch, into the desired shapes. These shapes are then allowed to cure for one week under atmospheric conditions and are then dried below about 300° F. They may be employed chemically bonded, or as burned bricks after firing to temperatures between 1500 and 1600° C., for several hours. Bricks of this composition have gone to 1715° C. under load of 25 pounds per square inch before failure by shear.

EXAMPLE VI

By the method of the invention a refractory may be produced comprising aggregate grains of forsterite bonded by forsterite, yielding a more nearly homogeneous refractory structure and a non-acid refractory which combines excellent strength at high temperatures with lighter weight and lower heat conductivity than that possessed by other basic or neutral refractories.

For example, such a refractory may be prepared from grain material made according to copending application, Ser. No. 532,210, filed April 21, 1944, whereby a synthetic forsterite material of relatively high purity is provided. A typical analysis of such grain is as follows:

| | Per cent |
|---|---|
| MgO | 56.91 |
| $SiO_2$ | 42.10 |
| CaO | 0.33 |
| $R_2O_3$ | 0.66 |

Forsterite grain material of this composition, which has been fired below the melting point but sufficiently to bring the components into equilibrium, is crushed and sized so as to provide a suitable refractory batch. When so prepared, all of the grain will pass a 4-mesh screen, and approximately half will pass a 20-mesh screen. The batch is blended in a wet-pan type mixer, and 100 parts by weight of the grain are wet with 5 parts of water containing, in solution 2 parts of magnesium chloride. To the moistened grain is admixed 10 parts of a dry intimate mixture of slow-setting caustic burned magnesia and of silica which is finer than 325-mesh and more than half of which is smaller than one micron in particle size. The magnesia and silica are used in the ratio of 134 parts of magnesia to 100 parts of the silica.

The fine magnesia and silica are thoroughly blended with the moistened grain, and the batch is then pressed into shapes under pressure of approximately 6000 lbs. per square inch or higher. The shapes are allowed to harden, are dried below about 350° F., and are then suitable for use as chemically bonded refractories. Or they may be fired to approximately 1500° C. for several hours to yield a pre-fired forsterite refractory.

The bond provided by the invention may be used to good advantage in basic refractory compositions of any type, for example, pressed shapes, masses adapted to be rammed into shape in molds or in place in the furnace, mortars, cements, spraying mixtures, etc. The utility of the bond is not limited to the examples cited, good results being obtainable with any refractory grain with which the bond is compatible at the temperature and under the conditions to which the refractory is subjected in service, including magnesia, chromite, forsterite, olivine, and spinels.

Refractories manufactured according to the teaching of the invention have given improved life over comparable known refractories in many instances, for example, in basic open hearth steel furnaces, rotary kilns, and the like.

The term basic refractories as employed in the specification and appended claims is intended to include all non-acid refractories, i. e. neutral as well as basic refractories.

Having thus described the invention, what is claimed is:

1. The method of making a refractory article of predetermined size and shape which comprises; thoroughly mixing with a major portion of a non-acid aggregate material, minor portions of bond-forming magnesia and silica each having a purity of at least about 95% and a particle size substantially entirely below 50 microns with a substantial fraction below 10 microns, the amount of magnesia being at least sufficient to react with all of the silica to form magnesium orthosilicate; and forming the resultant mixture into said predetermined size and shape.

2. The method of making a refractory article of predetermined size and shape which comprises; thoroughly mixing with a major portion of a non-acid aggregate material, minor portions of bond-forming magnesia and silica each having a purity of at least about 95% and a particle size substantially entirely below 50 microns with a substantial fraction below 10 microns, the amount of magnesia being at least sufficient to react with all of the silica to form magnesium orthosilicate; forming the resultant mixture into said predetermined size and shape; and firing the formed refractory between about 1200° C. to 1700° C. to develop in situ a bond by interaction of said magnesia and silica.

3. The method of making a refractory article of predetermined size and shape which comprises: thoroughly mixing with a major portion of non-acid aggregate material, a minor portion of water, a minor portion of chemical binder, and minor portions of bond-forming magnesia and silica each having a purity of at least about 95% and a particle size substantially entirely below 50 microns with a substantial fraction below 10 microns, the amount of magnesia being at least sufficient to react with all of said silica to form magnesium orthosilicate; and forming the resultant mixture into said predetermined size and shape.

4. The method of making a refractory article of predetermined size and shape which comprises: thoroughly mixing with a major portion of non-acid aggregate material, a minor portion of water, a minor portion of chemical binder, and minor portions of bond forming magnesia and silica each having a purity of at least about 95% and a particle size substantially entirely below 50 microns with a substantial fraction below 10 microns, the amount of magnesia being at least sufficient to react with all of said silica to form magnesium orthosilicate; forming the resultant mixture into said predetermined size and shape, and firing the formed refractory between about 1200° C. to 1700° C. to develop a bond from said magnesia and silica.

5. The method of claim 3 wherein said major portion of non-acid aggregate material constitutes at least about 80% by weight of said mixture and said minor portions of bond forming magnesia and silica together constitute from about 5 to 20% by weight of said mixture.

6. The method of claim 3 wherein the ratio by weight of magnesia to silica ranges between 1.34 to about 10 parts of magnesia to 1 part of silica.

7. A refractory article made in accordance with the method of claim 1.

8. A refractory article made in accordance with the method of claim 2.

9. A refractory article made in accordance with the method of claim 3.

10. A refractory article made in accordance with the method of claim 4.

11. A refractory article made in accordance with the method of claim 5.

12. A refractory article made in accordance with the method of claim 6.

13. The method of claim 1 wherein said non-acid aggregate material is essentially forsterite wherein the ratio of magnesia to silica content is substantially the same as the ratio of said minor magnesia portion to said minor silica portion.

14. A refractory article made in accordance with the method of claim 13.

15. In the production of refractory masses the step which comprises, thoroughly mixing with a major portion of a non-acid aggregate material, minor portions of bond forming magnesia and silica each having a high purity and being in a state of fine sub-division, the purity and degree of sub-division of said magnesia and silica being such that they will, upon heating, form crystalline magnesium orthosilicate in situ without appreciable fusion, and there being at least sufficient magnesia to react with all of the silica.

16. In the production of refractory masses the step which comprises, thoroughly mixing with a major portion of non-acid aggregate material, a minor portion of bond forming magnesia having a purity of at least about 95% and a particle size substantially entirely below 50 microns with a substantial fraction below 10 microns, and a minor portion of bond forming silica having a purity of at least about 95%, and a particle size substantially entirely below 50 microns with a substantial fraction below 10 microns and with a specific surface of at least about 6000 sq. cm. per gm., the amount of magnesia being at least sufficient to react with all of the silica to form magnesium orthosilicate.

17. A bonding composition for use in bonding non-acid aggregate materials into refractory masses, consisting essentially of: one part by weight of silica having a purity of at least about 95%, with a particle size substantially entirely below 50 microns, with a major fraction below 10 microns in fineness and with a specific surface of at least about 6000 sq. cm. per gm.; and from 1.34 to 10 parts by weight of magnesia having a purity of at least about 95%, and a particle size substantially entirely below 50 microns and with a substantial fraction below 10 microns in fineness.

18. In the production of refractory masses the step which comprises, throughly mixing with a major portion of non-acid aggregate material, a minor portion of bond forming silica having a purity of at least 95%, with a particle size substantially entirely below 50 microns, with a major fraction below 10 microns in fineness and with a specific surface of at least about 6000 sq. cm. per gm., and a minor portion of bond forming magnesia having a purity of at least about 95%, and a particle size substantially entirely below 50 microns with a substantial fraction below 10 microns in fineness, there being from 1.34 to 10 parts by weight of magnesia to 1 of silica.

19. The method of claim 1 wherein the refractory article is fired in use.

20. The method of claim 2 wheren the refractory article is fired in use.

21. The method of claim 3 wherein the refractory article is fired in use.

22. The method of claim 4 wherein the refractory article is fired in use.

LESLIE W. AUSTIN.

REFERENCES CITED

The following references are of record in the file of this patent:

UNITED STATES PATENTS

| Number | Name | Date |
|---|---|---|
| 1,782,295 | Goldschmidt | Nov. 18, 1930 |
| 2,026,088 | Harvey et al. | Dec. 31, 1935 |
| 2,077,795 | Harvey et al. | Apr. 20, 1937 |
| 2,060,697 | Seil | Nov. 10, 1936 |
| 2,206,131 | Seil | July 2, 1940 |
| 2,278,442 | Heany | Apr. 7, 1942 |